United States Patent [19]

Zodrow et al.

[11] 4,377,432

[45] Mar. 22, 1983

[54] METHOD AND APPARATUS FOR AFFIXING LABELS AND FOILS TO BOTTLES

[75] Inventors: Rudolf Zodrow, Düsseldorf; Hans-Werner Mohn, Kaarst, both of Fed. Rep. of Germany

[73] Assignee: Jagenberg-Werke AG, Düsseldorf, Fed. Rep. of Germany

[21] Appl. No.: 215,464

[22] Filed: Dec. 11, 1980

Related U.S. Application Data

[63] Continuation-in-part of Ser. No. 129,763, Mar. 12, 1980.

[30] Foreign Application Priority Data

Dec. 12, 1979 [DE] Fed. Rep. of Germany ....... 2949882

[51] Int. Cl.[3] ........................ B29C 17/04; B32B 31/00

[52] U.S. Cl. .................................... 156/215; 156/256; 156/521; 156/560; 156/DIG. 14

[58] Field of Search ............... 156/212, 213, 233, 521, 156/560, 566, 568, DIG. 8, DIG. 12, DIG. 16, DIG. 33, DIG. 14, 156/215, 264, 256, 364, 481; 271/300

[56] References Cited

U.S. PATENT DOCUMENTS 3,871,943 3/1975 Zodrow ...................... 156/DIG. 33

FOREIGN PATENT DOCUMENTS 1014922 8/1957 Fed. Rep. of Germany .
1586388 5/1970 Fed. Rep. of Germany .
1786043 11/1971 Fed. Rep. of Germany .
2160212 6/1973 Fed. Rep. of Germany .
2205040 5/1974 France .

*Primary Examiner*—Edward C. Kimlin
*Assistant Examiner*—Louis Falasco
*Attorney, Agent, or Firm*—Sprung, Horn, Kramer & Woods

[57] ABSTRACT

In the affixing of neck labels and foils to bottles wherein precut labels and foils are picked up at a station and glue-coated, turned over, and pressed onto the bottles by their glue-coated surfaces, the improvement which comprises feeding each foil and its respective neck label to the pickup station in such a way that during the pickup the lower edge of the foil is covered by the upper edge of the neck label, and pressing both foil and neck label onto the bottle substantially simultaneously in a single operation. An apparatus therefor is provided.

3 Claims, 2 Drawing Figures

METHOD AND APPARATUS FOR AFFIXING LABELS AND FOILS TO BOTTLES

This application is a continuation-in-part of Application Ser. No. 129,763, filed Mar. 12, 1980, now pending.

BACKGROUND OF THE INVENTION

The invention relates to a method and apparatus for affixing labels and foils to bottles wherein precut labels and/or foils are picked up at a station, glue-coated on one side as they are being picked up, turned over, and pressed onto the bottles by their glue-coated side, the foils and/or labels cut from a roll being fed individually and successively, without being coated with glue, to the pickup station for the foils and/or labels at the rate at which they are picked up by the gluing segments, in accordance with U.S. patent application Ser. No. 129,763, the disclosure of which is incorporated herein by reference. Foil here means any kind of wrap applied to a bottle neck, in other words, both a wrap which covers the bottle neck and crown cap, and a wrap which covers only the bottle neck and possibly also the rim of the crown cap. The foil may be a metal foil, a paper-backed metal foil, or paper.

Prior-art labeling and foiling methods can be divided into two groups so far as the transfer of the cut-to-size labels and foils is concerned. In the first of these groups, precut labels and foils are adhered to the bottle simultaneously or successively. An example of such a labeling and foiling apparatus is known from German patent 10 14 922. In that apparatus, label and foil are fed into the conveying path of the bottles and, as the bottles move on, wrapped around them, pressed onto them, and smoothed down.

The second group of labeling and foiling machines is characterized in that foil is pulled and cut discontinuously from a rolled-up web of foil, the pieces of foil so cut off being glue-coated and transferred to a gripper cylinder which then presses them onto the circumference of the bottle. Examples of such labeling and foiling machines are known from German patent 21 60 212, French patent 72 39 096, and German patent applications DOS 17 86 043 and DOS 15 86 388. The foil is either glue-coated before it is cut off, as in German patent 21 60 212, or then the glue is applied after or during the transfer of the cut-off foil to the gripper cylinder, as in German patent application DOS 15 86 388 or in French patent 72 39 096 and in German patent application DOS 17 86 043, respectively. With both groups of labeling and foiling machines, the cut-to-size foils can be adhered to the bottle neck also in diamond fashion.

The second group of labeling and foiling machines offers the advantage over the first group that foiling is cheaper since foil in rolls costs only about half as much as precut foils. On the other hand, a drawback of the second group of labeling and foiling machines is the relative complexity of the apparatus required for taking off, transferring and glue-coating the cut-to-size foils. Separate stations are provided for transferring them to the gripper cylinder and for coating them with glue.

The aforesaid U.S. patent application Ser. No. 129,763 relates to a method and apparatus allowing lengths of foil and/or labels to be cut from a rolled-up web, thus securing the advantage of lower cost over precut foils and/or labels, as with prior-art apparatuses, while also permitting a space-saving arrangement, dispensing with the need for additional gluing means for the cut-to-size foils and/or labels, and avoiding fouling of the machine through previously glue-coated foils and/or labels.

SUMMARY OF THE INVENTION

The object of the invention is to provide for the simultaneous affixing to the bottle of the cut-to-size foil and of the neck label which overlaps the lower edge of said foil. To this end, the present invention seeks to improve the method in accordance with the aforesaid U.S. patent application Ser. No. 129,763 in such a way that the additional station hitherto required for affixing the neck label can be dispensed with.

In accordance with the invention, this object is accomplished in that the cut-to-size foil and neck label are fed to the pickup station in such a way that during the pickup the lower edge of the foil is covered by the upper edge of the neck label.

BRIEF DESCRIPTION OF THE DRAWINGS

The method in accordance with the invention will now be described in greater detail with reference to the accompanying drawing, wherein.

DETAILED DESCRIPTION OF THE INVENTION

Figure 1:
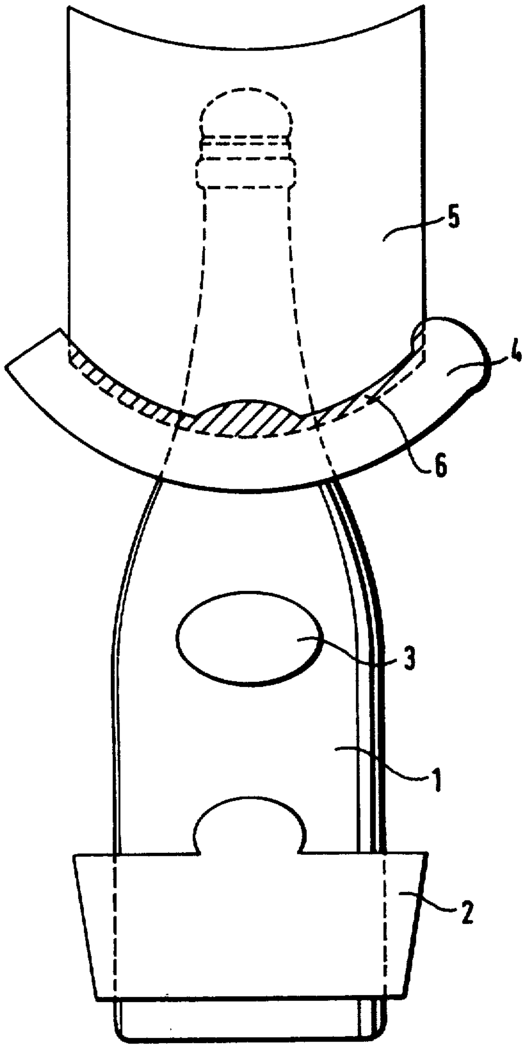
FIG. 1 shows a bottle with cut-to-size foil and labels.

Shown in FIG. 1 is the bottle 1 with the belly label 2, the breast lable 3 and the neck label 4 as well as the cut-to-size foil 5, whose lower edge is covered by the upper edge of the neck label 4 in the shaded area 6, just before the foil 5 and the labels 2, 3 and 4 are pressed onto the bottle 1.

Figure 2:
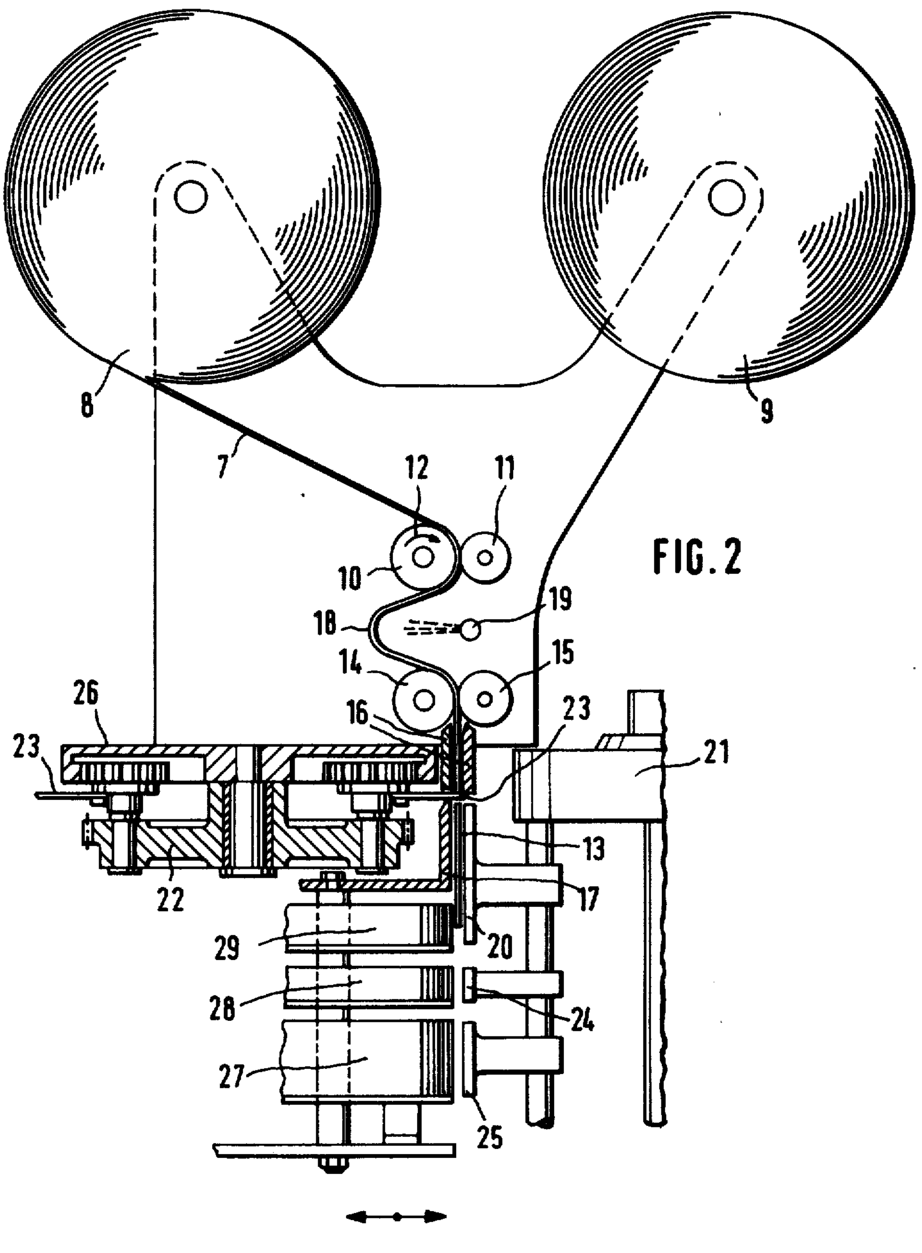
FIG. 2 illustrates the pickup of the cut-to-size foil and labels by the pickup means.

With the apparatus shown in FIG. 2, the foil web 7 is drawn from a supply roll 8, provision of a spare roll 9 permitting changeover. The foil web 7 is continuously drawn from the roll 8 by means of the take-off rolls 10 and 11 between which the web 7 moves, at least one of said rolls being driven to rotate in the direction indicated by the arrow 12, the conveying path of the roll 10 corresponding to the predetermined length of the cut-to-size foil 13. A second pair of take-off rolls 14 and 15 is driven intermittently in such a way that it advances the foil web 7 in the time interval between two pickup operations. The web then moves vertically downwardly through the guide 16 to a point in front of the support wall 17. The foil-web loop 18 forming between the take-off rolls 10 and 11 and the take-off rolls 14 and 15 when the latter are not turning is stabilized either through a spring- or weight-loaded rocker or through an air nozzle 19.

The severing of the length of foil 13 from the foil web 7 preferably occurs simultaneously with its pickup by the gluing segment 20. A cutting-blade arrangement is particularly well suited for this purpose. On a turntable 22 whose dimensions correspond to those of the gluing-segment turret 21 and which is driven to rotate in a direction opposite to that of the turret 21, cutting-blade segments 23 are rotatably or pivotably mounted in the same manner and arrangement as the gluing segments 20, 24 and 25 on the turret 21.

As the length of foil 13 is being picked up by the gluing segment 20, the support wall 17, which may be lined with a resilient layer, performs the function of the label stack. The length of foil 13 is severed by the cutting-blade segments 23 as it is picked up by the gluing segment 20 at the pickup station. The lower edge of one of the walls of the guide 16 then serves as counterblade.

The motions of the gluing segments 20, 24 and 25 and of the cutting-blade segments 23 in the pickup and cutting positions, respectively, are symmetrical. The motion of the cutting-blade segments 23 may be controlled either through a fixed cam or through a planetary gear train 26.

Gluing segment 25 picks up the belly label 2 from the lowermost label box 27 while gluing segment 24 picks up the breast label 3 from the label box 28.

At the pickup station the gluing segment 20 picks up from the uppermost label box 29 the neck label 4 and at the same time the length of foil 5, which is lowered by the rolls 14 and 15 to such a level that its lower edge is located slightly below the upper edge of the neck label 4 so that as they are picked up by the gluing segment 20 they are in the overlapping position shown in FIG. 1.

It will be appreciated that the instant specification and claims are set forth by way of illustration and not of limitation, and that various changes and modifications may be made without departing from the spirit and scope of the present invention.

What is claimed is:

1. In the affixing of neck labels and foils to bottles at their neck portion wherein precut labels and foils are picked up at a station and glue-coated, turned over, and pressed onto the bottles by their glue-coated surfaces, the improvement which comprises feeding each foil and its respective neck label to the pickup station in such a way that during the pickup the lower edge of the foil is covered by the upper edge of the neck label, and pressing both foil and neck label onto the neck portion of the bottle substantially simultaneously in a single operation.

2. A process according to claim 1, wherein simultaneously with the feed and pressing of the neck label and foil there is fed and pressed a belly label for the bottle.

3. A process according to claim 2, wherein the foil and neck label are disposed relative to one another so that the neck label covers a whole edge of the foil.

* * * * *